United States Patent [19]
Desilles

[11] 3,931,133
[45] Jan. 6, 1976

[54] SUSPENSION POLYMERIZATION PROCESS FOR ETHYLENIC MONOMERS

[75] Inventor: Jacques Desilles, Billere, France

[73] Assignee: Aquitaine Total Organico, Courbevoie, France

[22] Filed: Dec. 12, 1973

[21] Appl. No.: 426,619

Related U.S. Application Data

[63] Continuation of Ser. No. 211,062, Dec. 22, 1971, abandoned.

[30] Foreign Application Priority Data
Dec. 31, 1970  France .......................... 70.47502

[52] U.S. Cl. ...... 260/93.5 W; 260/92.8 W; 260/879; 260/880 R; 260/88.7 D; 260/89.5 AW
[51] Int. Cl. ........ C08f 7/04; C08f 3/76; C08f 19/02
[58] Field of Search .... 260/93.5 W, 92.8 W, 880 R, 260/879

[56] References Cited
UNITED STATES PATENTS

| | | | |
|---|---|---|---|
| 3,047,534 | 7/1962 | Dyer et al. | 260/880 R |
| 3,068,192 | 12/1962 | White | 260/880 R |
| 3,100,763 | 8/1963 | Melk et al. | 260/93.5 W |
| 3,328,374 | 6/1967 | Ronden et al. | 260/93.5 W |

*Primary Examiner*—William F. Hamrock
*Attorney, Agent, or Firm*—Burgess Ryan and Wayne

[57] ABSTRACT

This invention concerns a process for polymerizing ethylenic monomers in aqueous suspension, characterized by the use, as suspension agent, of an inorganic precipitate obtained by coprecipitating a mixture of soluble phosphate and carbonate containing at least 1 gram-ion of $CO_3^{--}$ to 3 gram-ions of $PO_4^{---}$ with a soluble salt of the metals in columns IIa and IIb of the periodic table of elements, or of aluminum or iron.

Styrene is preferably polymerized in the presence of a precipitate obtained by the action of calcium caloride on a mixture of sodium phosphate and carbonate containing between 1 gram-ion of $CO_3^{--}$ to 2 gram-ions of $PO_4^{---}$ and 2 gram-ions of $CO_3^{--}$ to 3 gram-ions of $PO_4^{---}$.

The spherical particles of polymer obtained are particularly suitable for the manufacture of expanded polymers.

25 Claims, No Drawings

SUSPENSION POLYMERIZATION PROCESS FOR ETHYLENIC MONOMERS

This is a continuation, of application Ser. No. 211,062, filed Dec. 22, 1971, now abandoned.

This invention concerns a new polymerization process for etaylanic monomers, characterized by the use of a new category of suspension agents.

A process has existed for some time to obtain polymers in the form of spherical particles, from ethylenic monomers. This is done by dispersing the monomer in a liquid medium which will not dissolve it (usually water), so that polymerization occurs inside the droplets in suspension. Suspension polymerization allows closer control of temperature, and control of the speed of polymerization and molecular weight. One of its major drawbacks, however, is that the polymer becomes sticky and viscous during polymerization, and tends to coagulate or cake.

This is usually overcome by adding a suspension agent which keeps the particles apart as they form. In particular, the addition of insoluble phosphates, such as barium, magnesium or calcium phosphates, which to some extent stabilize these suspensions, has been recommended. Under extremely restrictive operating conditions, notably as regards the percentage of insoluble phosphate in the aqueous phase and the ratio of organic phase — namely the monomer or monomers - to aqueous phase, these phosphates do reduce the tendency of the particles to coagulate or cake together. There are considerable difficulties, however: the results obtained are hard to reproduce, the stability of the suspension is poor, and the process lacks flexibility, because of the very narrow field of use of these phosphates. Attempts have been made to improve the process, for instance by controlling the pH value during polymerization, or by adding phosphates with particular grain-sizes. The major improvement consists of performing polymerization in the presence of surface-active agents and inorganic precipitates obtained in situ in the reaction mixture, notably those obtained from sodium phosphate and calcium chloride. This modification of the process has enabled earlier results to be improved considerably particularly as regards reproducibility, the stability of the suspension, and even the field of use. Many problems remain, however. Although use of these precipitates is slightly more flexible than for phosphates added in their original state, the range is still fairly restricted, and the presence of too high or low a percentage of precipitate in the aqueous phase can easily cause caking during polymerization.

In addition, this technique does not allow the size of the spherical particles to be controlled easily, or reasonably uniform grain-sizes to be obtained. This is a very important factor in certain applications, such as the manufacture of expanded polymers. Other disadvantages remain to be overcome, including polluted particles, clogging of reactors, and the limitation of the ratio of organic phase to aqueous phase, which cannot really rise above 1.

The present invention, involving the use of a new group of suspension agents, which are more active than existing inorganic precipitates, offers a way of improving all the operating conditions and results of earlier techniques.

The quantity of precipitate, for instance, can easily be increased without clogging the reactor, or reduced more than 20 times compared with existing methods, without any risk of caking. This is important, since the size of the polymer particles obtained is closely related to the percentage of precipitate present.

The process according to this invention also allows a much smaller range of grain-sizes to be obtained, and the size of the particles to be considerably increased. When, using earlier techniques, the percentage of precipitate was reduced by half under certain conditions, the size of the particles increased by about 20 %, whereas when the new suspension agents are used under the same conditions, the size of the particles can be increased by 200 %, when the same percentage of precipitate is reduced by half.

There are many other advantages: the products obtained are hardly if at all dirtied; results are much easier to reproduce; there is a marked increase in the ratio of organic phase to aqueous phase, without risk of caking, so that the hourly output of the machinery used is increased.

It should also be mentioned that the use of surface-active agents is no longer obligatory in the process according to the invention. In earlier processes, it was more or less essential to add surface-active agents, such as alkaline sulphonates, to inorganic precipitate; furthermore, the other conditions of the process often had to be adjusted whenever the nature of the agent was altered. In the present process, the nature and quantity of surface-active agents can be changed at will, and they can even be eliminated entirely, which is sometimes useful, as in the manufacture of impact polystyrene, where fairly large amounts of such agents previously had to be added.

The process according to the present invention consists of polymerizing ethylenic monomers suitable of polymerization in aqueous suspension, using as suspension agent an inorganic precipitate obtained by co-precipitating a mixture of soluble phosphate and carbonate containing at least 1 gram-ion of $CO_3^{--}$ to 3 gram-ions of $PO_4^{---}$ equivalents (i.e. 3 gram-ions of $PO_4^{---}$ or 3 gram-ions of $PO_4H^{--}$ or 3 gram-ions of $PO_4H_2^-$), by a soluble salt belonging to columns IIa and IIb of the periodic table of elements, or of aluminium or iron. For the invention to be implemented properly, the suspension agent should be prepared by precipitating the mixture of soluble phosphate and carbonate with a metal salt added in sufficient quantity for there always to be at least 10 metalious — in the case of divalent metal salts — to 6 $PO_4^{---}$ equivalents, and 1 metal ion to 1 $CO_3^{--}$ ion. In other words, the precipitate should be prepared by adding at least $(x + y\ 10/6)\ M^{++}$ to $x$ $CO_3^{--}$ and $y\ PO_4^{---}$, or $y\ PO_4H^{--}$, or $y\ PO_4H_2^-$. This method results, not as might be expected in a mixture of insoluble phosphate and carbonate, but in a single-phase compound precipitate, the formula of which varies depending on the percentages of carbonate and metal added.

In earlier processes, it was found that the inorganic precipitates used were sufficiently crystalline for it to be visible by X-ray, and this increased during polymerization. The risk of caking was also found to increase as the crystalline character increased. The compound precipitate obtained according to the invention does not show any crystalline character visible by X-ray, and although it increases during polymerization, it is still lower at the end than the initial crystalline character of earlier precipitates. It can therefore be assumed that one of the factors in the advantages of the process according to the invention is this slight crystalline character of the compound precipitate used. This is only an assumption, however, which helps to explain the invention, but which might be quite hard to verify. Clearly, the validity of the invention in no way depends on such verification, since the means employed and the results obtained are described adequately for the invention to be carried into effect.

When the invention is being applied industrially, it is generally unnecessary to add excessive amounts of carbonate, since beyond a certain level, carbonate with the formula $CO_3M$ appears alongside the new precipitate, the amount increasing in relation to the carbonate added in excess of this level.

Normally, the amount of $CO_3^{--}$ in the mixture of soluble phosphate and carbonate for precipitation will be between 1 gram-ion of $CO_3^{--}$ to 3 gram-ions of $PO_4^{---}$ equivalent and 1 gram-ion of $CO_3^{--}$ to 1 gram-ion of $PO_4^{---}$ equivalent, and preferably between 1 gram-ion of $CO_3^{--}$ to 2 gram-ions of $PO_4^{---}$ equivalent and 2 gram-ions of $CO_3^{--}$ to 3 gram-ions of $PO_4^{---}$ equivalent.

The soluble phosphates and carbonates used in the process according to the invention are usually alkaline phosphates and carbonates, and preferably sodium phosphate and sodium carbonate.

Soluble salts of metals in columns IIa and IIb and of aluminium and iron are generally nitrates, acetates or halides, and preferably chlorides.

The soluble salts used to coprecipitate the phosphates and carbonates are preferably barium, magnesium and in particular calcium salts.

To obtain the inorganic precipitate according to the invention, the mixture of soluble phosphate and carbonate is coprecipitated by adding a stoichiometric quantity or an excess of a metal salt. For economic reasons, there is usually not more than about 10 % moles excess.

In contrast with previous processes, the inorganic precipitate may be prepared in any way. For example, the soluble metal salt, such as calcium chloride, can be added without any special precautions to an aqueous suspension containing a mixture of sodium phosphate and carbonate with at least 1 gram-ion of $CO_3^{--}$ to 3 gram-ions of $PO_4^{---}$, until the stoichiometric quantity is reached. Excess calcium chloride may also be added. Conversely, a mixture of sodium phosphate and carbonate may be added to an aqueous suspension of calcium chloride. The coprecipitate may be prepared outside the reaction mixture and added to it in the polymerization container. It is preferable, however, to prepare it in situ in the reaction mixture, before or even during polymerization. Polymerization, in other words, may be started without suspension agents, provided that they are included in the reaction mixture before a conversion level of 60 % has been attained. It is advisable, however, to add the precipitate when the rate is between 20 and 50 %.

One improved feature of the process according to the invention, particularly useful when the size of the spherical particles needs to be increased and their size-range narrowed, consists of coprecipitating the mixture of soluble phosphate and carbonate by two soluble salts of two metals belonging to columns IIa and IIb of the periodic table of elements, or of iron or aluminium, and preferably by a mixture of soluble calcium and magnesium salts. The proportion of magnesium cation in this mixture is usually between 2 $Mg^{++}$ to 1 $Ca^{++}$ and 0.1 $Mg^{++}$ to 1 $Ca^{++}$, and preferably between 1 $Mg^{++}$ to 2 $Ca^{++}$ and 1 $Mg^{++}$ to 9 $Ca^{++}$.

The concentration of inorganic precipitate used in the process according to the invention and its improvements can vary widely since, as already explained, it can be higher than before, without causing dirtying of the reactor, or much lower, more than 20 times lower for instance, without causing caking. There is usually between 0.01 and 10 g of precipitate per litre of aqueous phase, more often between 0.1 and 5 g and preferably between 0.2 and 3 g per litre.

As already mentioned, the presence of surface-active suspension agents in the reaction mixture is not always necessary. However, it is sometimes advisable to use such agents, which may be cationic or non-ionic, but are preferably anionic, in quantities ranging from 0.005 to 2 % weight of the aqueous phase. They include organic sulphates and sulphonates such as octyl-sodium sulphate, tetradecyl-sodium sulphate, dodecyl-benzene-sodium sulphonate and others such as lecithin, sodium caprylate, sodium caproate and sodium oleate.

The ratio of organic phase (namely monomer or monomers) to aqueous phase can vary widely, but is usually between 3 and 0.5, preferably between 2 and 1, and particularly about 1.5.

The process according to the invention can be applied to any ethylenic monomer suitable for suspension polymerization. It can also be used to polymerize mixtures of monomers, or one or more monomers in which one or more polymers are dispersed or dissolved. Where polymerization occurs in the presence of polymers, it should be started in bulk, until a certain level of conversion is reached, for example between 5 and 40 %, and then continue in suspension. It can be performed with or without catalyst, and some heat may be applied. Finally, various chain-transfer agents, such as mercaptans, and other auxiliary agents commonly used in suspension polymerization, may be added.

One method of performing the process consists of co-precipitating the precipitate in situ and keeping it in suspension in the water by stirring. Any surface-active agents and other additives are added. Finally, the substances to be polymerized are added, together with the catalysts, and the mixture is stirred until a homogeneous dispersion in fine droplets is obtained. The temperature is then gradually raised to approximately 160°C, while stirring continues. After from 3 to 24 hours, depending on the monomers, catalysts and temperature, hard spherical particles of polymer are obtained.

Monomers that can be polymerized by this process include styrene, halogenated-styrenes, particularly chloro-styrenes, alkyl-styrenes, vinyl-naphthalenes, vinyl-pyridine, acrylonitrile and its homologues, alkyl acrylates and methacrylates, acrylic and methacrylic acids, vinyl and vinylidene halides, particularly vinyl chloride, vinyl esters such as vinyl acetate and propionate, acrylamide and methacrylamide, butadiene and isoprene.

Polymers in the presence of which polymerization can be performed include polybutadiene, polyisoprene, butadiene-styrene and butadiene-acrylonitrile copolymers, butyl and chloro-butyl rubber, ethylene-propylene copolymers and ethylene-propylene-diolefin terpolymers.

Many different catalysts can be used in the process. They should preferably be soluble in the monomer or monomers used. They may be peroxides or peresters, such as benzyl peroxide, tertiary-butyl perbenzoate, tertiary-butyl peracetate, ditertiary-butyl-peroxy-butane, 2.5-dimethyl 2.5-ditertiobutyl-peroxy-heptane, tertiary-butyl peroxide, dicumyl peroxide, tertiary-butyl perisononanoate, capryl peroxide, lauryl peroxide, bis (ditertiary-butyl-peroxy-cyclohexyl) 2.2 propane, tertiary-butyl perphthalate, chlorobenzyl peroxide, alkyl peroxydicarbonates, alkyl perpivalates, or combinations of these catalysts with one another or with other radical-type catalysts.

The process is used in particular to polymerize and copolymerize vinyl-aromatic monomers, preferably styrene. Styrene may be copolymerized, for instance, with acrylonitrile, methacrylonitrile, alkyl methacrylates and acrylates, vinyl chloride, and butadiene. It may also contain a dissolved rubber polymer such as a butadiene or isoprene polymer of copolymer; in this case, however, polymerization has to be started in bulk, until 5 to 40 % conversion has occurred, to ensure satisfactory products.

The following method may be used when polymerizing styrene. The styrene is placed in an aqueous suspension containing the new suspension agents and catalyst or catalysts, such as tertio-butyl perbenzoate and tertio-butyl peroxide. The temperature of the suspension, which is approximately 40°C, is then raised over one or two hours to between 90° and 120°C. Polymerization then begins, and the temperature continues to be raised over 2½ to 5 hours, either in succeeding stages or gradually, to between 130° and 160°C. This temperature is held for between half an hour and 4 hours, while polymerization is completed.

The following examples illustrate the invention and its advantages, without its being in any way confined to them.

In these examples :

P represents a suspension agent obtained by precipitating sodium phosphate by calcium chloride in situ:

C represents a suspension agent obtained by precipitating sodium carbonate by calcium chloride in situ:

PC 1/5, PC ⅓, PC ½ and PC ⅔ represent suspension agents obtained by coprecipitating mixtures of sodium phosphate and carbonate by calcium chloride in situ, the ratio of $CO_3^{--}$ to $PO_4^{---}$, in gram-ions, being 1/6, ⅓, ½, and ⅔;

PC ½ mg 1/9, PC ½ Mg ¼ and PC ⅓ Mg 3/7 represent suspension agents obtained by coprecipitating mixtures of sodium phosphate and carbonate in situ, in the ratios already mentioned, by mixtures of calcium chloride and magnesium chloride, so that the ratio of $Mg^{++}$ to $Ca^{++}$ in the precipitates, expressed in gram-ions, is 1/9, ¼ and 3/7;

c indicates that caking has occurred during polymerization;

n indicates that polymerization has occurred normally.

EXAMPLES 1 to 6

These examples are designed mainly to show the effect of the carbonate content of the precipitate on the polymerization of styrene.

The following ingredients are placed in turn in a 20-litre reactor, equipped with a 200 rpm stirrer :

| Water | 5 000 g |
| Precipitate obtained *in situ* | 10 g (i.e. 2 g per liter of water) |
| Dodecyl-benzene-sodium sulphonate | 0.05 g |
| Styrene | 5 000 g |
| Tertiary-butyl perbenzoate | 6.5 g |

The water in the reactor is first heated to 50°C, and the temperature is then raised steadily from 50° to 115°C, in 1¼ hours, and from 115° to 140°C, in 3 hours. It is then held at 140°C for one hour.

The following results are obtained.

| Example | Precipitate | Remarks on polymerization |
|---|---|---|
| 1 | P | c at 130°C |
| 2 | C | c at 130°C |
| 3 | PC 1/6 | c at 130°C |
| 4 | PC 1/3 | n |
| 5 | PC 1/2 | n |
| 6 | PC 2/3 | n |

EXAMPLES 7 to 18

These examples are designed mainly to show the effect of the concentration of precipitate and type of surfactant on the polymerization of styrene, according to the invention and according to the existing art.

The following ingredients are placed in turn in a 120-litre reactor equipped with a 110 rpm stirrer :

| Water | 45.000 g |
| Precipitate | 0.75, 1.5 or 3 g/l |
| Surface-active agent (lecitain or dodecyl-benzene-sodium sulphonate) | 4 g |
| Styrene | 55.000 g |
| Tertiary-butyl perbenzoate | 70 g |

Polymerization is performed as in examples 1 to 6. The following results are obtained.

| Ex. | Precipitate | Weight of precipitate | Surfactant | Remarks on polymerization |
|---|---|---|---|---|
| 7 | P | 135 g | Lecitain | c |
| 8 | PC 2/3 | 135 g | Lecitain | n |
| 9 | P | 135 g | Sulphonate | n |
| 10 | PC 2/3 | 135 g | Sulphonate | n |
| 11 | P | 67.5 g | Lecitain | c |
| 12 | PC 2/3 | 67.5 g | Lecitain | n |
| 13 | P | 67.5 g | Sulphonate | c |
| 14 | PC 2/3 | 67.5 g | Sulphonate | n |
| 15 | P | 33.75 g | Lecitain | c |
| 16 | PC 2/3 | 33.75 g | Lecitain | n |
| 17 | P | 33.75 g | Sulphonate | c |
| 18 | PC 2/3 | 33.75 g | Sulphonate | n |

EXAMPLES 19 to 23

These examples are designed mainly to show the effect of the type and concentration of precipitate on the polymerization of styrene.

The following ingredients are placed in turn in a 20-litre reactor equipped with a 300 rpm stirrer :

| water | 5 000 g |
| Precipitate | 0.2 to 4 g per liter of water |
| Dodecyl-benzene-sodium sulphonate | 0.1 g |
| Styrene | 5 000 g |
| Tertiary-butyl perbenzoate | 6.5 g |

Polymerization is performed as in examples 1 to 6. The following results are obtained.

| Examples | Precipitate | 4 g/l | 2 g/l | 1 g/l | 0.7 g/l | 0.5 g/l | 0.2 g/l |
|---|---|---|---|---|---|---|---|
| 19 | P | c | c | c | c | c | c |
| 20 | PC 1/6 | c | c | c | c | c | c |
| 21 | PC 1/3 | n | n | n | n | n | n |
| 22 | PC 1/2 | n | n | n | n | n | n |
| 23 | PC 2/3 | n | n | n | n | n | n |

EXAMPLES 24 to 37

These examples are designed mainly to show the effect of the concentration of surface-active agent on polymerization, according to the invention and according to the existing art.

The following ingredients are placed in turn in a 20-litre reactor equipped with a 200 rpm stirrer :

| | |
|---|---|
| water | 5 000 g |
| Precipitate | 0.8 g |
| Dodecyl-benzene-sodium sulphonate | 0 to 60 ppm/water |
| Styrene | 5 000 g |
| Tertiary-butyl perbenzoate | 6.5 g |

Polymerization is performed as in examples 1 to 6. The following results are obtained.

| Examples | Surfactant in ppm | Precipitate P | Precipitate PC 1/2 |
|---|---|---|---|
| 24 and 25 | 0 | c | n |
| 26 and 27 | 10 | c | n |
| 28 and 29 | 20 | c | n |
| 30 and 31 | 30 | c | n |
| 32 and 33 | 40 | c | n |
| 34 and 35 | 50 | n | n |
| 36 and 37 | 60 | n | n |

EXAMPLES 38 to 58

These examples are designed mainly to show the effect of the type and concentration of precipitate on the average size of the spherical particles.

The following ingredients are placed in turn in a 20-litre reactor equipped with a 200 rpm stirrer :

| | |
|---|---|
| Water | 5 000 g |
| Precipitate | 0.2 to 3 g per litre of water |
| Dodecyl-benzene-sodium sulphonate | 40 ppm/water |
| Styrene | 5 000 g |
| Tertiary-butyl perbenzoate | 6.5 g |

Polymerization is performed as in examples 1 to 6. The following results are obtained.

| Examples | Precipitate in g/l | Average size of particles in mm | | |
|---|---|---|---|---|
| | | P | PC 1/6 | PC 2/3 |
| 38, 39 and 40 | 0.2 | c | c | 1.10 |
| 41, 42 and 43 | 0.3 | c | c | 0.90 |
| 44, 45 and 46 | 0.5 | c | c | 0.74 |
| 47, 48 and 49 | 0.8 | 0.40 | 0.37 | 0.30 |
| 50, 51 and 52 | 1 | 0.37 | 0.34 | 0.23 |
| 53, 54 and 55 | 2 | 0.26 | 0.26 | 0.17 |
| 56, 57 and 58 | 3 | 0.22 | 0.20 | 0.12 |

EXAMPLES 59 to 61

Styrene is polymerized in the presence of tertio-butyl perbenzoate in a 15,000-litre reactor equipped with an 85 rpm stirrer.

The temperature is raised gradually from 40° to 113°C in 2 hours, and from 113° to 140°C in 3¼ hours; it is then held at 140°C for 2 hours.

The ingredients of the reaction mixture and results are shown in the following table.

| Ingredients | Precipitate in kg | | |
|---|---|---|---|
| | P | 0.2 PC 2/3 | 0.2 PC 1/2 Mg 1/4 |
| H$_2$O | 5330 | 5330 | 5330 |
| PO$_4$Na$_3$ | 14.9 | 3 | 3 |
| CO$_3$Na$_2$ | — | 1.28 | 0.97 |
| Cl$_2$Ca | 16.8 | 4.71 | 3.50 |
| Cl$_2$Mg | — | — | 0.75 |
| Dodecyl-benzene-sodium sulphonate | 0.395 | 0.095 | 0.110 |
| Styrene | 5325 | 5325 | 5325 |
| T-butyl perbenzoate | 5.3 | 5.3 | 5.3 |
| Average size of particles in mm | 0.15–0.30 | 0.40–0.80 | 0.40–0.60 |

These results show that, in spite of there being 5 times less phosphate and a smaller concentration of surfactant in the examples according to the invention than in the control example, larger particles are obtained.

EXAMPLES 62 to 64

A mixture of styrene and methyl methacrylate is copolymerized in the presence of benzyl peroxide, with tertiary-dodecyl mercaptan as transfer agent, in a 16-litre reactor equipped with a 200 rpm stirrer. Polymerization is performed in two stages : at 73°C for 6 hours after which the temperature is raised quickly to 95°C and held there for 1½ hours.

The ingredients of the reaction mixture and results are shown in the following table.

| Ingredients | Precipitate in g | | |
| --- | --- | --- | --- |
| | P | 0.5 PC 1/2 | PC 1/2 Mg 1/9 |
| H$_2$O | 6000 | 6000 | 6000 |
| PO$_4$Na$_3$ | 16.8 | 8.4 | 16.8 |
| CO$_3$Na$_2$ | — | 2.71 | 5.44 |
| Cl$_2$Ca | 19 | 12.3 | 22.2 |
| Cl$_2$Mg | — | — | 2.1 |
| N-octyl-sodium sulphate | 1.8 | 1.8 | — |
| Styrene | 1400 | 1400 | 1400 |
| Methyl methacrylate | 2600 | 2600 | 2600 |
| Benzyl peroxide | 34 | 34 | 34 |
| T-dodecyl mercaptan | 3.4 | 3.4 | 3.4 |
| Average size of particles in mm | 0.27 | 0.29 | 0.41 |

This table shows that when approximately the same amount of new precipitate (example 64) as conventional precipitate (example 62) is used, much better results are obtained, while when the amount is reduced by half (example 63), slightly better results are still obtained.

EXAMPLES 65 and 66

A mixture of styrene and acylonitrile is copolymerized in the presence of tertiary-butyl acetate and 2.5-dimethyl 2.5-ditertiary-butyl-peroxy heptane, in a 16-litre reactor equipped with a 150 rpm stirrer.

Polymerization is performed by raising the temperature of the mixture quickly to 110°C, holding it at this level for 3½ hours, then raising it to 140°C in half an hour, and holding it at this level for an hour.

The ingredients of the reaction mixture and the results are shown in the following table.

| Ingredients | Precipitate in g | |
| --- | --- | --- |
| | P | 0.5 PC. 1/3 Mg 3/7 |
| H$_2$O | 5 000 | 5 000 |
| PO$_4$Na$_3$ | 14 | 7 |
| CO$_3$Na$_2$ | — | 1.51 |
| Cl$_2$Ca | 15.8 | 6.63 |
| Cl$_2$Mg | — | 2.50 |
| Dodecyl-benzene-sodium sulphonate | 0.15 | 0.05 |
| Styrene | 3 870 | 3 870 |
| Acrylonitrile | 1 130 | 1 130 |
| Tertiary-butyl peracetate | 5 | 5 |
| 2.5-dimethyl 2.5-ditertio-butyl-peroxy heptane | 2 | 2 |
| Average size of particles in mm | 0.32 | 0.37 |

EXAMPLES 67 to 69

Styrene is prepolymerized in bulk, in the presence of 8 % polybutadiene, until approximately 30 % conversion has taken place. The prepolymer is then placed in a 16-litre reactor equipped with a 125 rpm stirrer, and polymerization is completed in the presence of a mixture of catalysts consisting of tertio-butyl perbenzoate and ditertio-butyl-peroxy butane.

The reaction is performed in two stages : the temperature is raised quickly to 115°C and held at this level for 2½ hours, then held at 130°C for ½ hours.

The ingredients of the reaction mixture and the results are shown in the following table.

| Ingredients | Precipitate in g | | |
| --- | --- | --- | --- |
| | P | 0.15.PC 2/3 | PC.1/2 Mg 1/4 |
| H$_2$O | 5 500 | 5 500 | 5 500 |
| PO$_4$Na$_3$ | 15.4 | 7.7 | 15.4 |
| CO$_3$Na$_2$ | — | 3.3 | 5 |
| Cl$_2$Ca | 17.4 | 12.2 | 18.1 |
| Cl$_2$Mg | — | — | 3.86 |
| N.octyl-sodium sulphate | 50 | 50 | 50 |
| Prepolymer | 3 000 | 3 000 | 3 000 |
| Tertiary-butyl perbenzoate | 3.3 | 3.3 | 3.3 |
| Ditertio-butyl-peroxy butane | 2.7 | 2.7 | 2.7 |
| Average size of particles in mm | 0.90 | 1.58 | 1.52 |

EXAMPLES 70 to 74

Styrene is polymerized in the presence of tertio-butyl perbenzoate, in a 500-litre reactor equipped with a 100 rpm stirrer.

The reaction is performed by raising the temperature gradually from 50° to 113°C in 1½ hours, and then from 113° to 140°C in 3¼ hours, after which it is held at this level for an hour.

The ingredients of the reaction mixture and the results are shown in the following table.

| Ingredients | Precipitate in kg | | | | |
| --- | --- | --- | --- | --- | --- |
| | P | 0.5 P | 0.5 PC 2/3 | 0.5 PC 2/3 | 0.5 PC 1/2 Mg 1/4 |
| H$_2$O | 210 | 210 | 210 | 210 | 210 |
| PO$_4$Na$_3$ | 0.59 | 0.30 | 0.30 | 0.30 | 0.30 |

-continued

| Ingredients | P | 0.5 P | Precipitate in kg 0.5 PC 2/3 | 0.5 PC 2/3 | 0.5 PC 1/2 Mg 1/4 |
|---|---|---|---|---|---|
| CO₃Na₂ | — | — | 0.126 | 0.126 | 0.095 |
| Cl₂Ca | 0.66 | 0.33 | 0.460 | 0.460 | 0.345 |
| Cl₂Mg | — | — | — | — | 0.074 |
| Dodecyl-benzene-sodium sulphonate | 0.012 | 0.012 | 0.012 | 0.004 | 0.003 |
| Styrene | 200 | 200 | 200 | 200 | 200 |
| Tertiary-butyl perbenzoate | 0.2 | 0.2 | 0.2 | 0.2 | 0.2 |
| Average size of particles in mm | 0.25–0.4 | c | 0.25–0.4 | 0.4–0.85 | 0.85–1.25 |

EXAMPLES 75 to 77

Vinyl chloride is polymerized for 6 hours in the presence of lauryl peroxide, in a 16-litre reactor equipped with a 300 rpm stirrer.

The ingredients of the reaction mixture and the results are shown in the following table.

| Ingredients | P | Precipitate in g 0.5 PC 2/3 | 0.5.PC 1/2 Mg 1/9 |
|---|---|---|---|
| H₂O | 6 950 | 6 950 | 6 950 |
| PO₄Na₃ | 19.5 | 9.7 | 9.7 |
| CO₃Na₂ | — | 4.2 | 3.14 |
| Cl₂Ca | 22 | 15.4 | 12.8 |
| Cl₂Mg | — | — | 1.22 |
| Dodecyl-benzene-sodium sulphonate | 0.4 | 0.135 | 0.07 |
| Vinyl chloride | 4 500 | 4 500 | 4 500 |
| Lauryl peroxide | 5.4 | 5.4 | 5.4 |
| % Conversion | 71 | 68 | 72 |
| Average size of particles in mm | 0.12 | 0.150 | 0.140 |

What is claimed is:

1. A process for the suspension polymerization of styrene in the presence of a tertiary butyl perbenzoate, which comprises co-precipitating in water, a mixture of an alkali metal phosphate and an alkali metal carbonate containing at least one gram-ion of carbonate to 3 gram-ions of phosphate equivalents by means of a soluble salt of metals selected from the group consisting of calcium, barium, magnesium, iron and aluminum in an amount of at least 10 metal ions to 6 phosphate equivalents and 1 metal ion to each carbonate ion, at a temperature range from about ambient to 40°C, dispersing in the thus obtained suspension, whose concentration range is from 0.01 to 10 g/liter, the said styrene and tertiary butyl perbenzoate, then raising the temperature of the resulting suspension to about 140°C for a period of from 3 to 24 hours.

2. A polymerization process according to claim 1, in which the mixture of soluble phosphate and carbonate contains not more than 1 gram-ion of CO₃⁻⁻ to 1 gram-ion of PO₄⁻⁻⁻ equivalents.

3. A polymerization process according to claim 2, in which the mixture of soluble phosphate and carbonate contains between 1 gram-ion of CO₃⁻⁻ to 2 gram-ions of PO₄⁻⁻⁻ equivalents, and 2 gram-ions of CO₃⁻⁻ to 3 gram-ions of PO₄⁻⁻⁻ equivalents.

4. A polymerization process according to claim 1, in which the soluble salts are nitrates of said metals.

5. A polymerization process according to claim 1, in which the soluble salts are halides of said metals.

6. A polymerization process according to claim 1, in which the soluble salts are acetates of paid metals of the periodic table of elements.

7. A polymerization process according to claim 1, in which the soluble salts are barium salts.

8. A polymerization process according to claim 1, in which the soluble salts are magnesium salts.

9. A polymerization process according to claim 1, in which the soluble salts are calcium salts.

10. A polymerization process according to claim 1, in which the mixture of soluble phosphate and carbonate is coprecipitated by a mixture of soluble salts of two different metals.

11. A polymerization process according to claim 10, in which the mixture of soluble phosphate and carbonate is coprecipitated by a mixture of calcium and magnesium salts.

12. A polymerization process according to claim 11, in which the mixture of calcium and magnesium salts contains between 2 Mg⁺⁺ to 1 Ca⁺⁺ and 1 Mg⁺⁺ to 10 Ca⁺⁺.

13. A polymerization process according to claim 12, in which the mixture of calcium and magnesium salts contains between 1 Mg⁺⁺ to 2 CA⁺⁺ and 1 Mg⁺⁺ to 9 Ca⁺⁺.

14. A polymerization process according to claim 1, in which a stoichiometric quantity of soluble salts is added to the mixture of phosphate and carbonate.

15. A polymerization process according to claim 1, in which a molar excess of approximately 10 % of soluble salts is added to the mixture of phosphate and carbonate.

16. A polymerization process according to claim 1, in which the precipitate is prepared in the reaction mixture, before polymerization begins.

17. A polymerization process according to claim 1, in which the precipitate is prepared in the reaction mixture during polymerization, before 60 % conversion has occurred.

18. A polymerization process according to claim 17, in which the precipitate is prepared in the reaction mixture during polymerization, before 50 % conversion has occurred.

19. A polymerization process according to claim 1, in which the concentration of precipitate is between 0.01 and 10 g per litre of aqueous phase.

20. A polymerization process according to claim 19, in which the concentration of precipitate is between 0.1 and 5 g per litre of aqueous phase.

21. A polymerization process according to claim 1, in which the suspension medium contains a surface-active agent.

22. A polymerization process according to claim 1, in which the ratio of organic phase to aqueous phase is between 3 and 0.5.

23. A polymerization process according to claim 22, in which the ratio of organic phase to aqueous phase is between 2 and 1.

24. A polymerization process according to claim 1, in which polymerization occurs in the presence of a polymer.

25. A polymerization process according to claim 24, in which polymerization is begun in bulk until between 5 and 40 % conversion has occurred, after which it is completed in suspension.

* * * * *